(12) United States Patent
Kolacz et al.

(10) Patent No.: US 6,354,320 B1
(45) Date of Patent: Mar. 12, 2002

(54) ACCELERATION SENSITIVE SHUT OFF VALVE FOR FIREFIGHTING EQUIPMENT

(75) Inventors: David J. Kolacz, Plymouth; Ross Mack, Valparaiso; Stewart McMillan, Valparaiso; Robert W. Steingass, Valparaiso, all of IN (US)

(73) Assignee: Task Force Tips, Inc., Valparaiso, IN (US)

(*) Notice: Subject to any disclaimer, the term of this patent is extended or adjusted under 35 U.S.C. 154(b) by 0 days.

(21) Appl. No.: 09/516,281

(22) Filed: Mar. 1, 2000

(51) Int. Cl.[7] .................. F16K 31/00; F16K 31/44; A62C 39/00; B05B 15/06
(52) U.S. Cl. ............... 137/38; 169/91; 239/285; 239/581.1; 239/587.2; 251/66
(58) Field of Search .................. 137/38, 355.18; 239/285, 581.1, 587.2; 169/91; 251/66

(56) References Cited

U.S. PATENT DOCUMENTS

| | | | |
|---|---|---|---|
| 3,072,294 A | * | 1/1963 | Myers .................. 222/74 |
| 3,940,107 A | | 2/1976 | Allenbaugh, Jr. |
| 4,162,042 A | * | 7/1979 | Mommsen et al. ......... 239/526 |
| 4,252,278 A | | 2/1981 | McMillan |
| 4,392,618 A | | 7/1983 | Evans et al. |
| 4,470,549 A | | 9/1984 | McMillan et al. |
| 4,570,899 A | | 2/1986 | Kingham |
| 4,589,439 A | | 5/1986 | Steingass |
| 5,383,605 A | * | 1/1995 | Teague .................. 239/526 |
| 5,593,092 A | | 1/1997 | McMillan et al. |
| 5,735,435 A | * | 4/1998 | Kobayashi et al. ......... 222/63 |

FOREIGN PATENT DOCUMENTS

DE 1 104 275 4/1961
FR 2713961 * 6/1995

OTHER PUBLICATIONS

Helitactics Limited, Sniper Attack Monitor, 1 pg., 1999.

* cited by examiner

Primary Examiner—George L. Walton
(74) Attorney, Agent, or Firm—Lathrop & Clark LLP (57) ABSTRACT

A firefighting monitor having an acceleration sensitive shut off valve that responds to acceleration of the monitor to reduce water flow through the monitor. The acceleration sensitive shut off valve is self-contained and requires no contact with an external surface or device. The valve closing speed may be modulated by a dampener device that slows the rate at which the valve closes to avoid damage from water hammer.

37 Claims, 8 Drawing Sheets

ACCELERATION SENSITIVE SHUT OFF VALVE FOR FIREFIGHTING EQUIPMENT

FIELD AND BACKGROUND OF THE INVENTION

This invention relates generally to shut off valves and more particularly to an acceleration sensitive shut off valve for firefighting equipment such as portable monitors.

Firefighting monitors are used to deliver large quantities of water or foam in firefighting situations. A monitor has an inlet connected to a hose or pipe and a discharge on which a nozzle is mounted. The monitor itself typically is made from two or more rigid sections that can be adjusted relative to one another to redirect a stream of fluid in vertical and horizontal directions. The objective of a monitor is to serve as a support for a nozzle so the nozzle can deliver large volumes of fluid in firefighting situations. A consequence of large flow firefighting nozzles is that they generate large reaction forces that can not be restrained by hand. Reaction forces vary depending upon flow volume and pressure. The reaction force is always opposite the direction at which the stream is directed. As a result, any device or monitor configuration that is used to resist the reaction forces must take into account a number of variables.

Portable monitors are moved around to attack fires from various locations and angles. A portable monitor may be set on a variety of surfaces. Leg spikes and tie down straps can be used to secure the monitor against movement. Some surfaces are better able to resist the reaction forces than others. On smooth surfaces a monitor may tend to slide forward as its hose is being charged with water and then slide back or to the side when the stream exits the nozzle while fighting a fire. As the elevation angle is lowered the tendency for the portable monitor to slide is increased due to the horizontal component of the nozzle reaction forces being increased. Typically, a firefighter can prevent movement of the monitor by tying it down or operating it at high elevation angles, but on occasion, a monitor may slip out of control with the possibility of human injury or property damage. At the least, the monitor stream will be redirected away from the point intended by the firefighter.

The tendency to resist sliding can be increased by adding weight to the monitor, but added weight inhibits ease of repositioning a monitor. Sliding can also be resisted by looping hose around the monitor to add weight. Multiple hoses can be used to feed a monitor and provide added stability, but more expensive multiple inlets are required. Multiple hoses require more set up time than a single hose and repositioning a monitor with multiple hoses is more difficult. Multiple hose lines consume more space and have limited usefulness inside of burning structures.

The ability to control the flow of water may be desirable to control the nozzle reaction forces to safe levels, limit water or foam usage, or reduce water damage. Current portable monitors do not have a manual shut off valve. To stop or limit fluid flow through these monitors, the fluid must be shut off at a remote location such as the fire truck, fire hydrant, or a valve in a hose line. Typically, there is considerable distance between the monitor and the shut off valve and noise at the fire scene makes communication between the operating crew very difficult, necessitating radio communication. A separate valve added to the inlet or discharge of a monitor is possible, but would add substantial weight and size to the unit. More size and weight in turn makes repositioning the monitor more difficult. Some specialty nozzles have shut off valves built in, but these are limited in size and type and, thus, can not be relied upon for all circumstances.

Further, not all valve types are practical for use in a portable monitor because turbulence through a valve can make the portable monitor more difficult to manage and limit the nozzle's reach. Slide type valves such as those disclosed in U.S. Pat. Nos. 4,252,278; 4,470,549; and 4,589,439 introduce minimal turbulence. Despite the benefits of this type of valve, no portable monitor has ever used a slide type valve.

It is sometimes desired to add a hose or dividing valve to the discharge of a portable monitor to extend firefighting operations. Therefore, monitors must first be shut off and then the nozzle must be removed to add hose or dividing valves.

One monitor available from Task Force Tips, Inc. of Valparaiso, Ind. under the trademark Crossfire® and described in U.S. Pat. No. 5,593,092, has an automatic valve built into it. The valve can not be used to regulate the flow of the water, nor can it completely shut off the flow of water. Once set to an open position, the valve can not be manually closed. This valve automatically reduces flow if the monitor moves, particularly if that movement is to tip over the monitor. This device is useful and has added considerably to the safe use of portable monitors. Nonetheless, the Crossfire® has a trip mechanism that must be in contact with the ground while the monitor is in use. Uneven or soft ground can result in inadvertent closure of the valve. While this monitor is safer than others commercially available, sliding movement where the trip mechanism is still in contact with the ground can still cause injury or property damage or simply a disruption in firefighting operations. Consequently, even such a safe monitor should be tied down when in use, thereby limiting somewhat, the ability to quickly reposition the monitor.

Thus, there is a need for an improved monitor valve that can be controlled at the monitor without the cooperation of an operator at a remote location. Further, there is a need for a shut off valve that requires no interaction with the ground and is also sensitive to acceleration in addition to tipping movement.

SUMMARY OF THE INVENTION

The present invention provides a monitor with a valve that can be controlled by a monitor operator. The valve may include an acceleration sensitive shut off device that reacts when the monitor accelerates or tips. The valve is triggered by a device that requires no contact with the ground or other external surface.

Another object of the present invention is to provide a portable monitor that is easily repositioned even inside burning structures and on surfaces of different elevations.

Another object of the present invention is to enable the safe use of extremely low discharge angles by having a valve that shuts off should the monitor accelerate.

Another object of the present invention is to provide a portable monitor that can have fluid flow controlled at the monitor for quicker changing of nozzle, hoses, and dividing valves.

Another object of this invention is to include an acceleration sensitive shut off valve that moves the valve toward a closed position at a speed that limits the danger of the monitor whipping out of control.

Another object of the present invention is to integrate a shut off valve into a monitor without substantially increasing monitor weight and size.

It is yet another object of the present invention to provide a monitor valve that can be operated in a variety of valve flow positions with minimum turbulence to maximize stream reach.

Thus, to meet these and other objectives, there is provided by the present invention a valve having an open position and a closed position, the valve being biased toward the closed position and including: a housing defining a recess; a handle operatively mounted to the housing for moving the valve to the open position; a sear for engaging the handle when the valve is in the open position; a sear spring for urging the sear into engagement with the handle when the valve is in the open position; a release for disengaging the sear from the handle; and a bearing member disposed in the recess of the housing and in bearing support of the release when the valve is in the open position, whereby dislodging the bearing member from the recess removes the bearing member from bearing support of the release, moves the release to disengage the sear from the handle, to move the valve toward the closed position.

The valve can be a slide type valve or any other valve suitable for use with the high flows experienced by monitors.

The valve housing recess may be a groove and the bearing member can be one or more rods that rest in the groove. The bearing member can be two or more rods disposed end-to-end in the groove when the valve is in the open position.

The valve can have a plurality of open positions and the handle can be adapted to move the valve between the closed position and any of the open positions.

The sear spring can be a leaf spring, and it can have a first end fixed to the sear and a second end for engagement by the release. The release can be pivotably mounted to the housing. Preferably, the bearing member returns to the recess by gravity when the valve is in the closed position.

The valve housing can, and preferably does, include a firefighting monitor.

The valve can include a dampener to slow the closing of the valve after the sear releases the handle. The dampener can include a chamber fixed to the housing; a pivot fixed to the valve handle for movement with the valve and valve handle between the open position and the closed position, the pivot disposed in the chamber; and a fluid disposed in the chamber and substantially surrounding the pivot, the fluid having a viscosity greater than the viscosity of air.

The valve release can be pivotably mounted to the housing and have a first end on one side of the pivot and a second end on the opposite side of the pivot; the first end for engaging the sear spring; and the second end including a bearing surface for bearing on the bearing member when the valve is in the open position.

A monitor in accordance with the present invention includes: a housing defining a water passage; a valve disposed in the water passage, for moving between an open position and a closed position and being biased toward the closed position; a valve handle for moving the valve between the open position and the closed position; a sear for engaging the valve handle in the open position; a sear spring for urging the sear into engagement with the handle in the open position; a release mounted on the housing and having a release portion for moving the sear out of engagement with the handle; and; an acceleration sensor joined to the housing and disposed to engage the release to move the sear out of engagement with the handle and thereby close the valve when the housing experiences acceleration.

A portable monitor in accordance with the present invention includes: a housing defining a water passage; a valve disposed in the water passage movable between an open position and a closed position; a valve handle for moving the valve between the open position and the closed position; and an acceleration sensitive device joined to the housing and operable to close the valve when the housing experiences acceleration.

DETAILED DESCRIPTION OF THE DRAWINGS

Figure 1:
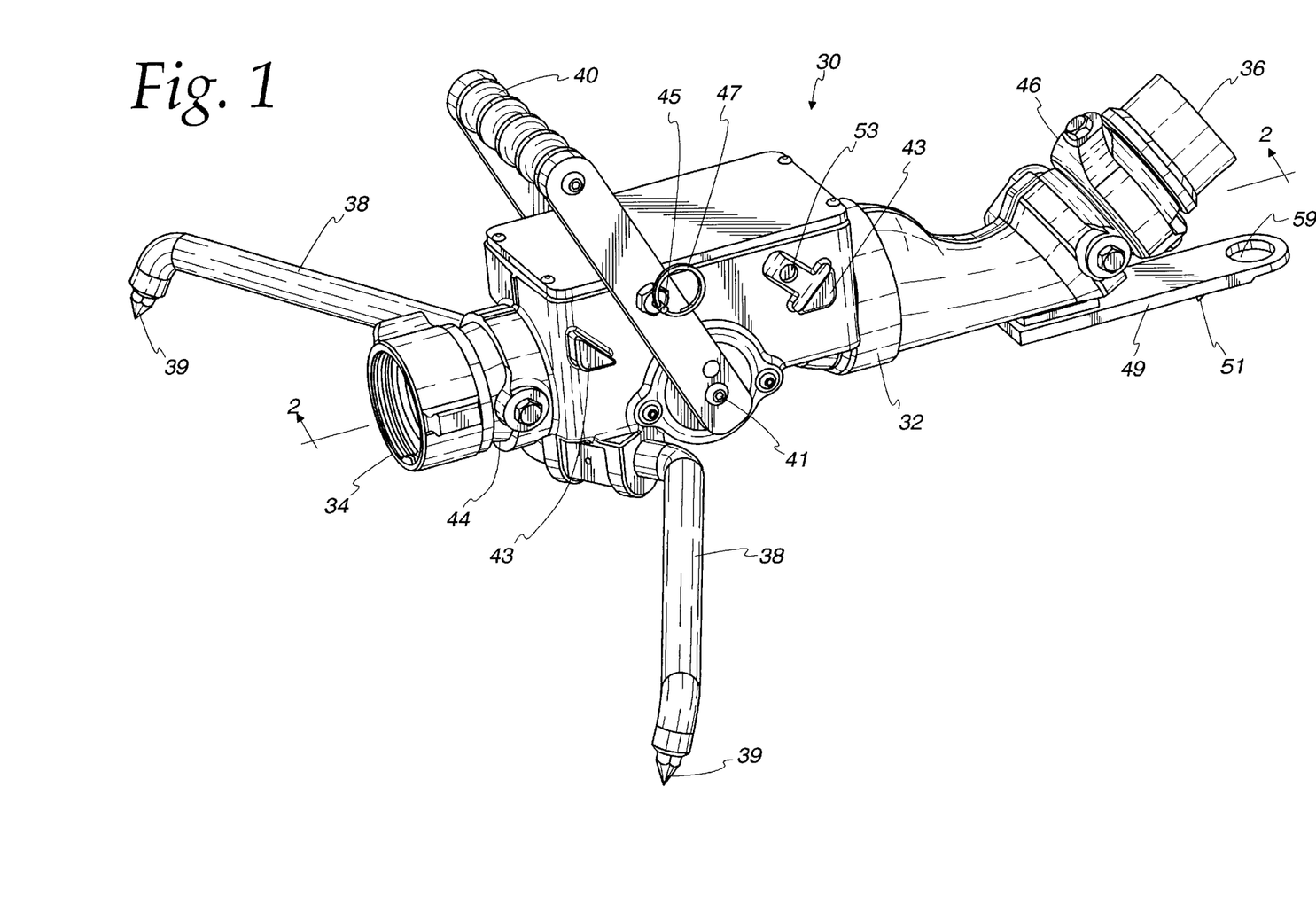
FIG. 1 is a perspective view of a firefighting monitor in accordance with the present invention.

In the following detailed description of the drawings, the same reference numeral will be used to identify the same or similar elements of the invention as illustrated in each of the figures. Illustrated generally in FIG. 1, is a perspective view of a portable monitor 30 in accordance with the present invention. The monitor 30 generally includes a housing 32, an inlet 34, a discharge 36, folding legs 38, and a valve handle 40.

The housing 32 is preferably made of cast aluminum and defines a fluid passageway between the inlet 34 and the discharge 36. Joined to the inlet 34 is a swivel inlet coupling 44 that is to be coupled to a hose or pipe that feeds the monitor 30 with firefighting fluid such as water or foam. The inlet coupling 44 is intended to pivot to permit the monitor 30 to sit flat on a support surface even where the hose is oriented at an angle to that surface. Other inlet types can be used with the present invention.

Similarly, the monitor discharge 36 is connected to a pivot discharge coupling 46 that is to be coupled to a nozzle (not illustrated). The pivot discharge coupling 46 can be adjusted relative to the monitor 30 to direct a stream of firefighting fluid. The discharge pivot coupling 46 is adapted to be coupled to various nozzles to enable the monitor 30 to be used to fight fires in hazardous conditions under various circumstances. As with the inlet coupling 44, other discharge couplings could be used with the present invention.

The folding legs 38 pivot forward or backward to make the monitor 30 more compact for storage and transportation. Preferably, the folding legs 38 include spikes 39 formed integrally with or joined to the folding legs 38. The spikes 39 aid in transferring reaction forces from a nozzle to a support surface.

The valve handle 40 is preferably pivotably mounted to both sides of the monitor 30 at pivots 41. Limiting travel of the valve handle 40 are stops 43 that can be formed integrally with the monitor housing 32 or joined thereto using suitable connectors. The valve handle 40 also serves as a carrying handle. Thus, to avoid accidental operation of the monitor 30, the valve handle 40 preferably includes a spring-loaded locking pin 45 that locks the valve handle 40 in the closed position until a lock pin ring 47 is pulled outward to remove the locking pin 45 from a corresponding recess 53 in the monitor housing 32. Once the lock pin 45 is pulled from the recess, the valve handle 40 is not restrained and can be moved to any open position. The spring-loaded locking pin 45 will not restrain the valve handle 40 until the valve handle 40 is returned to the closed position.

Figure 2:
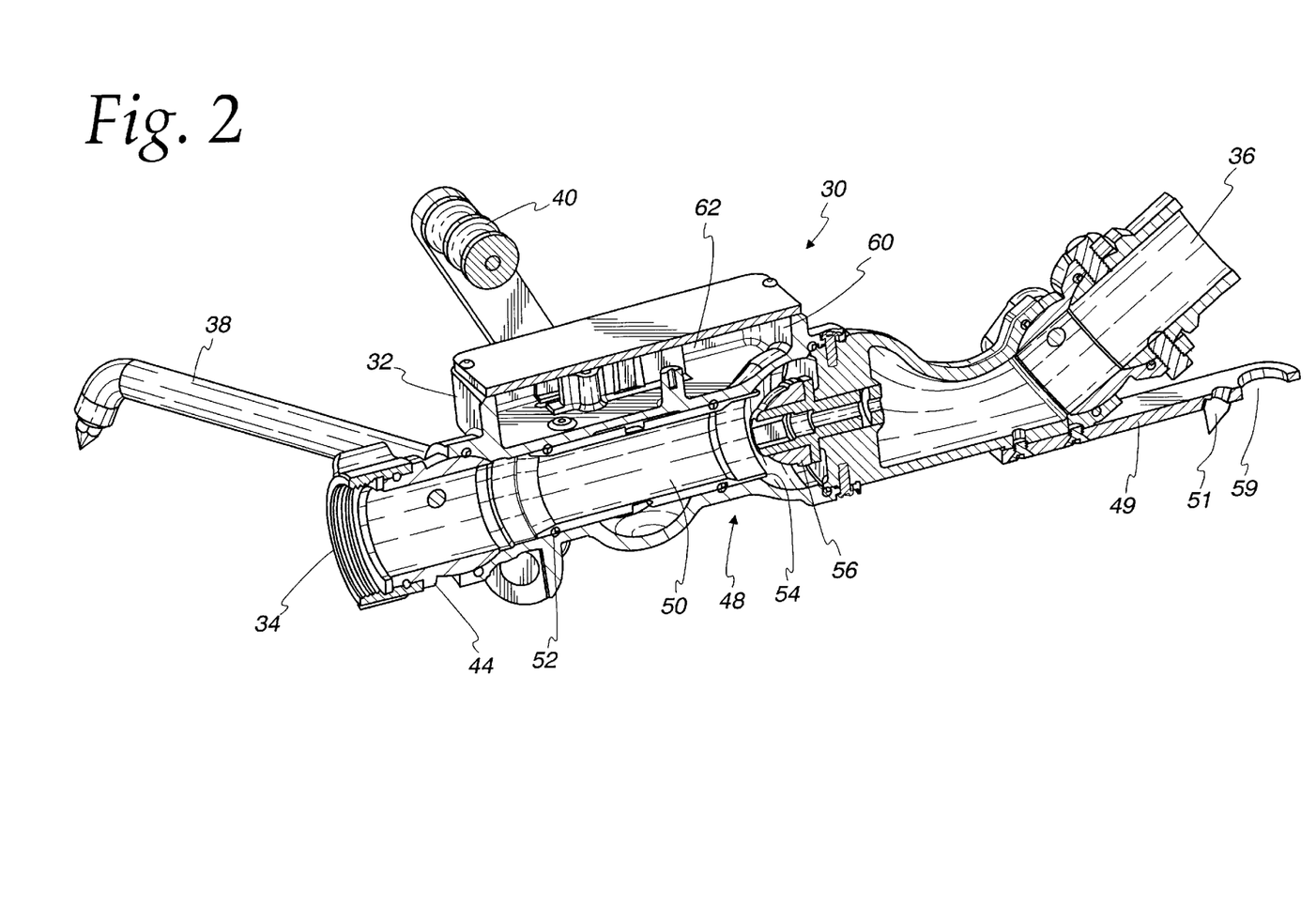
FIG. 2 is a cross-sectional view of the monitor taken along line 2—2 in FIG. 1.
Figure 3:
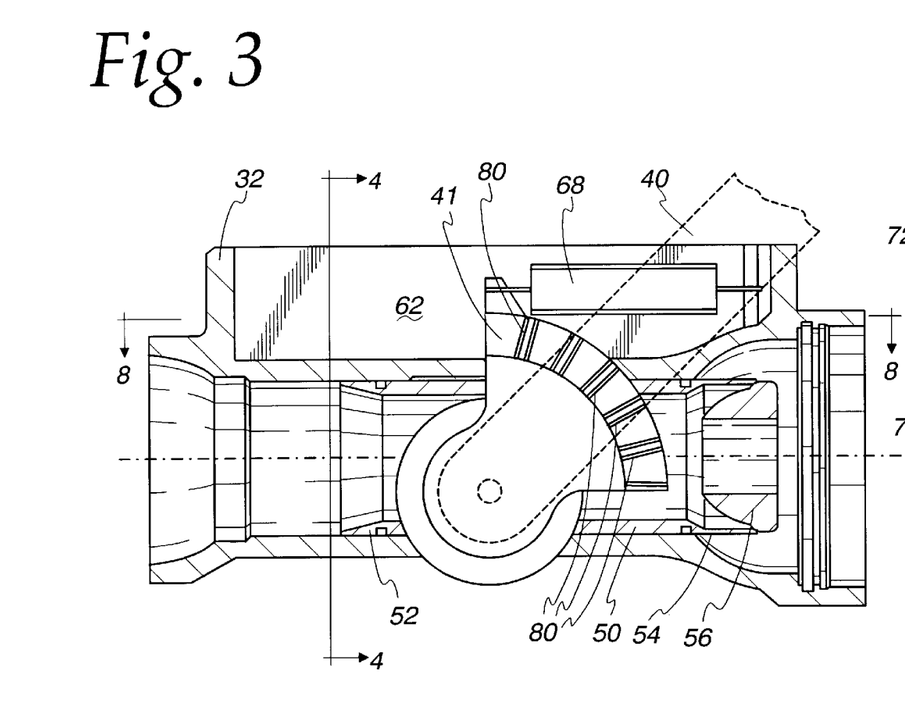
FIG. 3 is a partial side view of the monitor and valve handle.

As best seen in FIG. 2, also joined to the monitor housing 32, is a front leg 49 that is fitted with a spike 51. The front leg 49 is fixed, but it can be foldable. Preferably, there is a hole 59 so that the monitor 30 can be hung from a hook during storage, or tied off to stationary objects when flowing water, or if enlarged it may be used as a carrying handle.

It should be understood that the type of portable monitor illustrated in these drawings is intended to permit the flow of large volumes of firefighting fluid. Although a preferred monitor shape and style are described and illustrated herein, other monitor styles can also be used with the present invention because the invention lies in a valve that can be operated using a valve handle 40 and in the acceleration sensitive shut off mechanism described below.

Also illustrated in FIG. 2, between the inlet 34 and the discharge 36, is a valve 48 that is preferably a slide type valve including a sliding tube 50. The tube 50 has an upstream end 52 and a downstream end 54. The downstream end 54 engages a plug 56 in a closed position. To open such a valve 48, the valve handle 40 is moved to the left, as illustrated, to move the tube 50 toward the monitor inlet 34 and away from the plug 56 to permit firefighting fluid to flow through the tube 50, past the plug 56, and toward the discharge 36. Such a valve arrangement is simple, lightweight, and introduces low turbulence at partially opened positions. It has the further advantage that it can be biased toward a closed position by virtue of fluid flowing through the tube 50 and toward the plug 56. Additional details regarding such slide-type valves are disclosed in U.S. Pat. No. 4,252,278; U.S. Pat. No. 4,470,549; and U.S. Pat. No. 4,589,439, the disclosures of which are incorporated herein by reference. Although this is a preferred valve for the present invention, other valve types can be used, such as ball valves and gate valves. To bias these types of valves toward a closed position, there can be springs acting directly on the valves themselves or on the related components such as the valve handle 40.

In addition to having the valve 48 operated by the valve handle 40, the present invention includes an acceleration sensitive valve shut off mechanism 60 illustrated in FIGS. 3 through 8. The acceleration sensitive valve shut off mechanism 60 of the present invention can be activated when the monitor 30 merely slides on a support surface because the mechanism 60 is sensitive to acceleration and deceleration of the monitor 30 that can occur any time the monitor 30 slides or tips. Of course, not all acceleration should activate the shut off mechanism 60. Rather, only those accelerations that have a potential for allowing an operator to lose control of the monitor 30 should activate the mechanism 60.

The acceleration sensitive valve shut off mechanism 60 is preferably mounted 0n the housing 32 with many of the moving components secluded in a lidded chamber 62 (FIG. 2) of the monitor housing 32 to protect them from the elements and harsh fire scene conditions. As illustrated in FIG. 2, the chamber 62 is positioned at the top of the housing 32, but it could be in other locations. The important relationship between the shut off mechanism 60 and the housing 32 is that the mechanism 60 must be sensitive to any acceleration of the housing 32 and must, therefore, be in a fixed relationship relative to the housing 32. Otherwise, acceleration of the housing 32 might not be detected by the shut off mechanism 60.

The shut off mechanism 60 in its various operating positions is best illustrated in FIGS. 3, 4, 5, 6, 7, and 8 which illustrate four different positions of the shut off mechanism 60 during use. The mechanism 60 includes the valve handle 40, a sear 66, a closing spring 68 (shown only in FIGS. 3 and 4), a sear spring 69, a release 70, a pair of rods 72, and a recess 74 for receiving the rods 72.

The valve handle 40 is pivotably joined to the monitor housing 32 and includes an arc-shaped detent rack 41 that extends up into the lidded chamber 62 through a slot 63 on one side of the valve 48. The arc-shaped detent rack 41 of the valve handle 40 includes a series of radially oriented detents 80 that are shaped and sized to releasably accommodate a tongue 82 on the sear 66. In this manner, as the valve handle 40 is moved back and forth, the sear tongue 82 will engage the closest of the valve handle detents 80. In addition to the detents 80, the valve handle 40 includes a recessed portion 84, the function of which is explained below. Further, the closing spring 68 (FIGS. 3 and 4) is contained in the housing chamber 62.

The sear 66 is mounted in the housing chamber 62 on a pivot 88 that is offset from the sear tongue 82 to enable movement of the tongue 82 relative to the valve handle 40.

The sear 66 is used to hold the valve handle 40 in the desired open position much like a sear in a gun that maintains a firing pin in a cocked position until a trigger is pulled. It the present mechanism, the sear 66 maintains the valve handle 40 in the open position until the shut off mechanism 60 is activated, as described below.

A reset spring 71 (FIGS. 5 to 8) is disposed between a stationary wall 92 and the sear 66 at a location that is offset from the sear pivot 88 to reset the mechanism 60 when the valve is closed. In this manner, the sear 66 is urged to pivot toward the valve handle 40 at all times. The reset spring 71 allows the mechanism to automatically reset when the valve is closed. Due to the shape of the sear tongue 82 and the valve handle 40, the sear 66 can be pivoted away from the valve handle 40 against the bias of the closing spring 68, the sear spring 69 and the reset spring 71 to reposition the handle 40 when desired. As discussed above, water flowing through the valve 48 also provides bias toward the closed position. The sear 66 retains the handle 40 in the closest detent 80 until it is desired by the operator to move the handle 40, or until the acceleration sensitive shut off mechanism 60 is activated.

The sear spring 69 is connected to the sear 66 at the sear spring proximate end and a distal end extends away from the sear 66 and into an opening 103 of the release 70. Although depicted as a leaf spring, the sear spring 69 could be other types of springs as well.

The release 70 is pivotably mounted to the housing 32 on a pivot 98. On one side of the pivot 98 there is an opening 103 that is defined by a spring tensioning tab 100 and a rest 102. On the opposite side of the pivot 98, there is a bearing surface 104.

Figure 4:
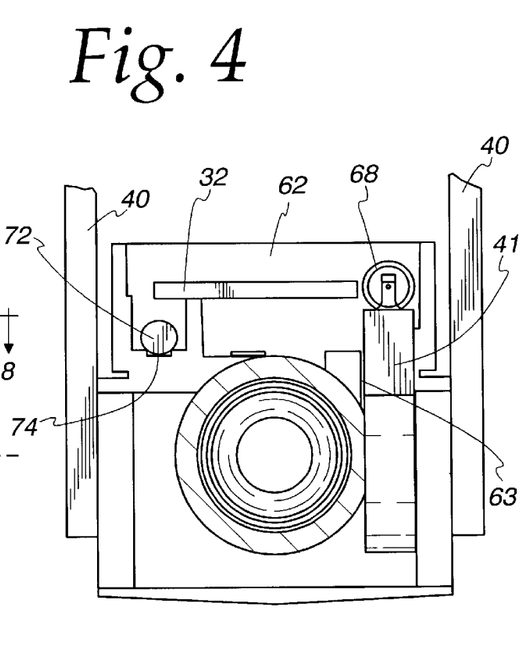
FIG. 4 is a cross-sectional view of the monitor taken along line 4—4 in FIG. 3.
Figure 7:
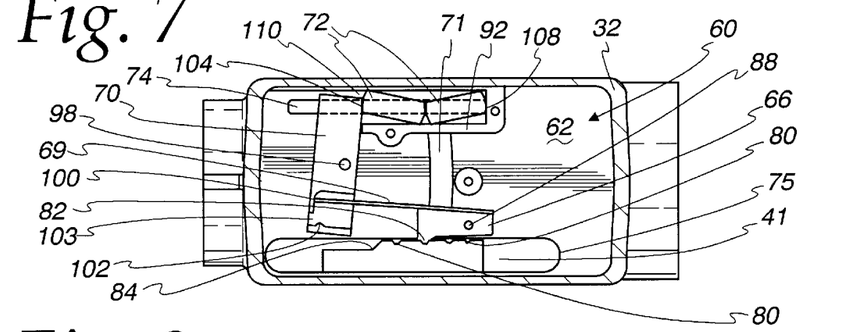
FIG. 7 is the acceleration sensitive valve shut off mechanism of FIGS. 5 and 6 in at the instant of tripping.

The bearing surface 104 of the release 70 bears on a bearing member, which in this embodiment is a pair of rods 72 positioned end-to-end. The bearing member serves as an acceleration sensor to react to acceleration of the monitor housing 32. The rods 72 are supported in a groove 74 that is narrower than the diameter of the rods 72 (See: FIG. 4). Further, the ends of the rods 72 are cone shaped with the vertex being rounded (preferably to a radius equal to the radius of the rod or ¼ inch in the present embodiment) so that they can be dislodged from the slot in which they rest due to gravity. The rounded ends are desirable because they do not hinder dislodgment of the rods 72 and aid in allowing the rods 72 to fall back into the groove 74 when the mechanism 60 is being reset. When the rods 72 are positioned end-to-end, they have a combined length that extends between a support wall 108 and the bearing surface 104 of the release 70. When the rods 72 have been dislodged from the slot, the combined length of the rods 72 is thereby reduced because one or both rods have pivoted or moved to the side. In such a position, the rods 72 no longer support the release 70 on its bearing surface 104 and the release 70 is able to pivot clockwise, as illustrated in FIG. 7.

FIG. 4 illustrates an end view of the rods 72 resting in the groove 74. As can be seen, the rods 72 have a cross-sectional diameter that is greater than the width of the groove 74. Other than the groove 74, the rods 72 are unrestrained from movement. Thus, acceleration of the housing 32 and the groove 74, can result in the rods 72 being dislodged from the groove 74. For a given rod diameter, a narrow groove requires less force to dislodge the rods, and a wide groove requires more force to dislodge the rods. Preferably, the rods 72 have a diameter of 0.50 of an inch and the groove 74 has a width of 5/16 of inch. Using a groove 74 that is axially aligned with the fluid flow through the monitor 30 gives the rods 72 enough stability to withstand minor or non-threatening accelerations of the monitor 30 in the axial direction, but enough sensitivity to lateral acceleration to ensure safe operation of the monitor 30.

In the preferred embodiment the mechanism 60 would be activated by lateral accelerations of 0.7 g or greater. One "g" equals the theoretical acceleration of an object falling due to gravity. The preferred embodiment would also be activated by vertical accelerations of 1 g from dropping or bumping the monitor vertically.

A pair of rods is preferred over a single rod (although one rod will work in this invention) because two rods can more easily pivot out of a bearing position while the ends of the rods roll on the surfaces they contact. Since the rods typically move by rolling rather than sliding, friction and axial loads do not influence the amount of acceleration necessary to trip the device. Preferably, the ends of the rods 72 are conical with the points machined to a radius. The radius of the cone vertex is preferably equal to the radius of the rod body (one quarter of an inch in the above-described preferred embodiment). When rod ends are machined to a hemispherical shape, the rods might rest against one another in a tripped position rather than return to the groove 74 after they have been dislodged.

As one skilled in the art will recognize, other types of bearing elements and arrangements can be used to serve the same function as the pair of rods 72. For example. a single rod in a groove could be used. A bearing ball in a circular recess can also be used and would be more sensitive to acceleration in all directions. An important consideration is not only the shape or number of these bearing elements and their respective recesses, but that they act as a bearing member that can withstand force from the release 70 when the monitor 30 is being operated safely and that they can be dislodged to allow the release 70 to "trip" the mechanism 60 when excessive acceleration or deceleration is applied to the monitor 30. It is noted that as used herein and in the claims, "acceleration" is used in a broad sense to include acceleration and deceleration.

Further, it should be noted that the bearing member could be dislodged when other types of conditions are encountered. For example, a key (not illustrated) could be in contact with the bearing member and tethered to a firefighter. Should the firefighter move or be knocked away from the monitor 30, the tether would pull the key to dislodge the bearing member and activate the shut off mechanism 60, even though the monitor 30 never moved.

Figure 8:
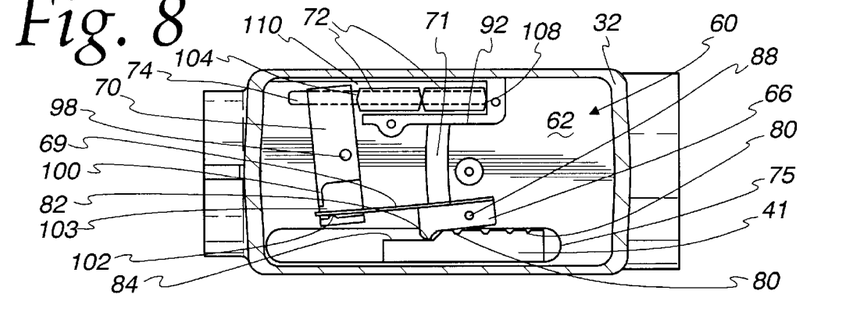
FIG. 8 is the acceleration sensitive valve shut off mechanism of FIGS. 5, 6, and 7 in a tripped position and taken along line 8—8 of FIG. 4.

With such an arrangement, the operation of the shut off mechanism 60 is best explained with reference to the drawings. As illustrated in FIG. 8, the valve handle 40 is positioned to its extreme right (valve closed), the sear 66 is in an extreme counter-clockwise position, the reset spring 71 is biasing the sear 66 and sear spring 69 to cause the release 70 to be in an extreme counter-clockwise position with the sear spring 69 distal end extending out of the release opening 103, and the rods 72 are resting (due to gravity) in the groove 74, but the rods 72 are not in contact with the bearing surface 104 of the release 70 because the sear spring 69 is not urging the release 70 in the clockwise direction.

Figure 5:
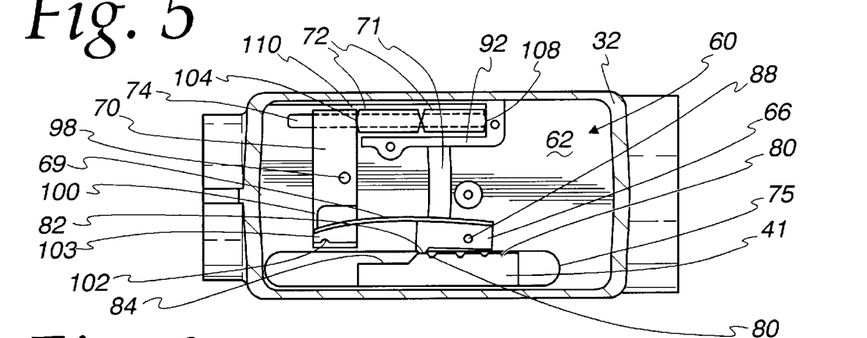
FIG. 5 is a plan view of an acceleration sensitive valve shut off mechanism in accordance with the present invention, in an opening or closing position.

FIG. 5 illustrates the shut off mechanism 60 as the valve is in the process of being opened or closed. As the valve handle 40 is moved to the left (as illustrated), the sear tongue 82 moves from the valve handle recess 84 to the raised portion with the detents 80. This action rotates the sear 66 in a clockwise direction, compresses the reset spring 71, and forces the distal end of the sear spring 69 into contact with the release pivot tensioning tab 100. The sear spring 69 rotates the release 70 in the clockwise direction and causes bearing contact between the bearing surface 104 and the rods 72. Due to the combined length of the rods 72, the release 70 can rotate only a limited amount. In turn, the sear spring 69 is caused to bend (or be loaded) against the end of the spring loading tab 100.

Figure 6:
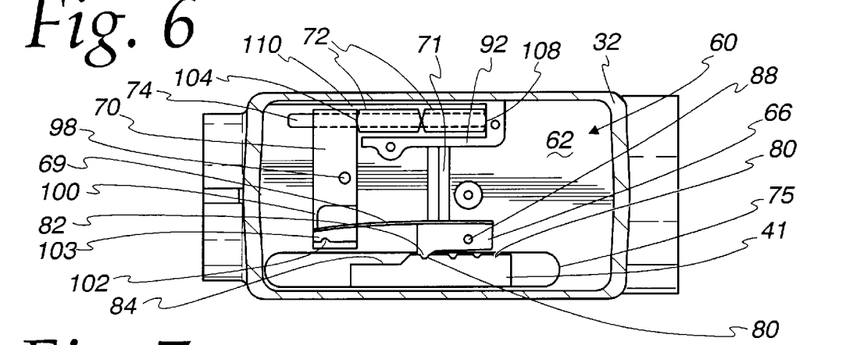
FIG. 6 is the acceleration sensitive valve shut off mechanism of FIG. 5 in a set position.

FIG. 6 illustrates the shut off mechanism 60 with the valve in one of the open detented positions.

FIG. 7 illustrates the shut off mechanism 60 at the instant it is activated or "tripped." The mechanism 60 is tripped when the rods 72 are dislodged from the groove 74 in which they normally rest. The dislodgment of the rods 72 can occur when the monitor 30 is accelerated or decelerated. Constant velocity movement can not dislodge the rods 72 because there is no force that can overcome the force of gravity and the compression of the rods 72 caused by the release 70.

Once the rods 72 have been displaced by acceleration of the monitor housing 32, there is no longer any bearing support for the release 70, which tends toward rotating in a clockwise direction due to the action of the sear spring 69 on the release spring loading tab 100. Consequently, the spring loading tab 100 rotates out of engagement with the distal end of the leaf spring 69 thereby releasing load in the sear spring 69. When the sear spring 69 is released there is only slight force from the reset spring 71 holding the sear 66 in engagement with the valve handle detents 80. With only slight force holding the valve handle 40 in place, the valve will automatically move toward the closed position by urging of the closing spring 68 and the forces due to water flowing through the valve 48. That is to say, nothing in the mechanism 60 will keep the valve open, but if a firefighter is in control of the monitor 30, the handle 40 can be held open until it is convenient to reset the mechanism 60. In this position, the release 70 cooperates with the support wall 108 to define a dimension that is too small to allow the rods 72 to reenter the groove 74. Thus, the mechanism 60 can not be accidentally reset until the valve 48 has been completely closed.

As illustrated in FIG. 8, absent override by the firefighter, the valve handle 40 will be pulled toward closed (to the right as illustrated). In this position, the sear 66 will rotate counterclockwise at the urging of the reset spring 71 until the sear tongue 82 rests in the valve handle recessed portion 84. When this happens, the sear spring 69 rotates counterclockwise and into contact with the release rest 102, which causes the release 70 to rotate counterclockwise as well. Once this rotation is complete, the release bearing surface 104 cooperates with the support wall 108 to define a dimension large enough to accommodate both rods 72 positioned end-to-end in the groove 74. The rods 72 simply fall back into the groove 74 due to gravitational forces. The rods 72 are confined in an area 110 that is large enough to allow rod displacement from the groove 74, but small enough to ensure that the rods 72 will fall back into the groove 74 as soon as there is adequate room between the bearing surface 104 and the wall 108.

Fast closure of the valve 48 is necessary to reduce the risk of injury or property damage in the event that there is unacceptable acceleration of the monitor 30. Nonetheless, closing the valve too fast could damage the valve 48, the monitor 30, water pump (not illustrated), or hose feeding the monitor 30 as a result of a water hammer that can occur when valves are closed too abruptly. Further, a valve that closes too quickly is undesirable because rapid deceleration of the fluid causes the monitor 30 to slide forward as the hose stretches to absorb the energy. The sliding due to a quickly closed valve can move the monitor as much as two or three feet. The monitor 30 slides forward fast enough to strike people in the vicinity.

In the commercial version of the prior art Crossfire® monitor, the valve was smaller than the fluid passageway and would not completely close the monitor. A portion of the water would still flow through the monitor which would enable the operator to regain control of the monitor without creating a potentially dangerous water hammer that could damage the monitor or the hoses feeding the monitor.

Figure 9:
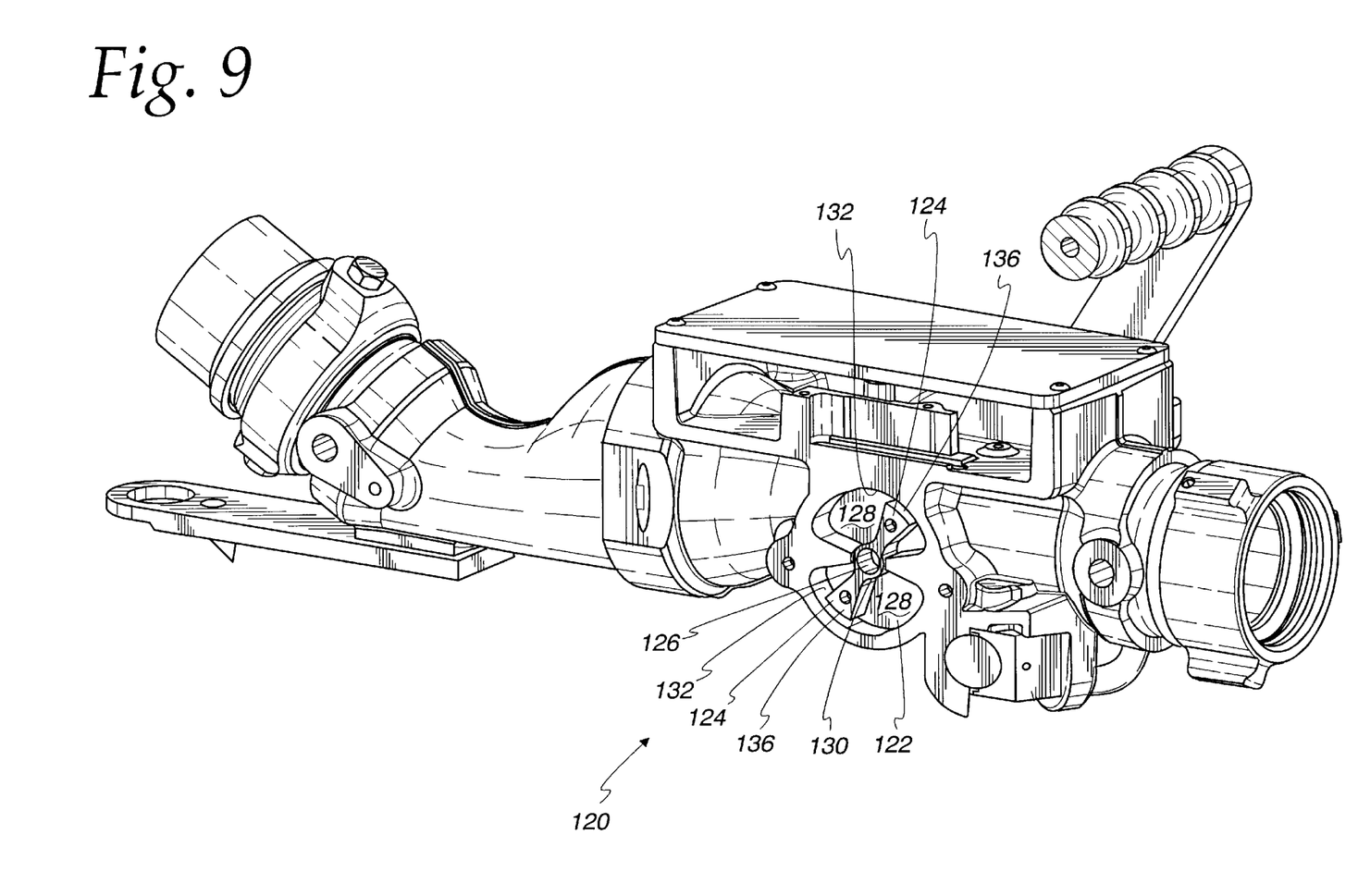
FIG. 9 is a cross-section of a valve closing dampener in accordance with the present invention.

To avoid damage that could be caused by water hammer, the present invention is preferably fitted with a dampening mechanism 120, as illustrated in FIG. 9. The dampening mechanism 120 is mounted on the monitor housing 32 and includes a chamber 122 and a, paddle 124 connected directly to the valve handle 40 which pivots on each side of housing 32.

The chamber 122 includes two primary pockets 128 that are joined by a central portion 130. Disposed in the chamber 122 is the paddle 124 that pivots with the valve handle 40 as the valve handle 40 opens and closes because the valve handle 40 and the paddle 124 are both joined. The paddle 124 is symmetrical about the center shaft 126 and each half includes a radiused portion 136 with an outer radius. Each radius 132 of time pockets 128 is contoured so that the clearance between the paddle 124 and the pockets is greater when the valve 48 is fully open than when it is fully closed. In this manner, the valve will move quickly to an intermediate position and then slow down for the final closing. By tailoring the geometry and the fluid viscosity, any desired valve closing characteristics can be achieved. In the preferred embodiment, the paddle 124 has an outer radius of 1.5 inches which is spaced apart from the inner radius of the chamber 122 in a gradual range from 0.050 of an inch to 0.080 of an inch to provide gradual closure of the paddle 124. Further, the chamber 122 is preferably ⅝ of an inch deep to provide adequate depth and control of the paddle 124.

As stated, to provide the necessary dampening effect on valve closure, the chamber 122 is filled with a fluid having viscosity at least greater than air and is preferably a lithium soap thickened silicone grease. An alternate fluid that would work in the present invention would have a kinematic viscosity 60,000 centistokes ("cs"), such as high viscosity polydimethylsiloxane polymers manufactured to yield linear polymers. Suitable fluid is available from Dow Corning under the trademark 44 Light High Temperature Bearing Grease or 200® Fluid, 60,000 cs. Thus, when the valve 48 attempts to close quickly, the movement of the paddle 124 will be dampened by the flow of viscous fluid past the paddle 124. The faster the paddle 124 and the valve 48 move, the more resistance the grease applies because the shear of the grease is dependent upon the speed of the moving components. Thus, the greater the viscosity of the fluid, the slower the valve 48 will close. In the preferred embodiment a closing speed of about 0.5 seconds is optimal.

In selecting an appropriate fluid, the conditions surrounding the monitor 30 should be considered such as fire scenes are harsh environments, temperature extremes, dirt, debris, or other factors can affect operation of the dampener.

Another embodiment of an acceleration sensitive shut off mechanism in accordance with the present invention is illustrated in FIGS. 10 to 14. This acceleration sensitive shut off mechanism 200 includes a valve handle 202 with detents 204, a pivoted sear 206, a leaf spring 208, a release 210, a release magnet 212, a pivoted trip 214, a first peg 216, and a pair of trip pegs 218.

Figure 10:
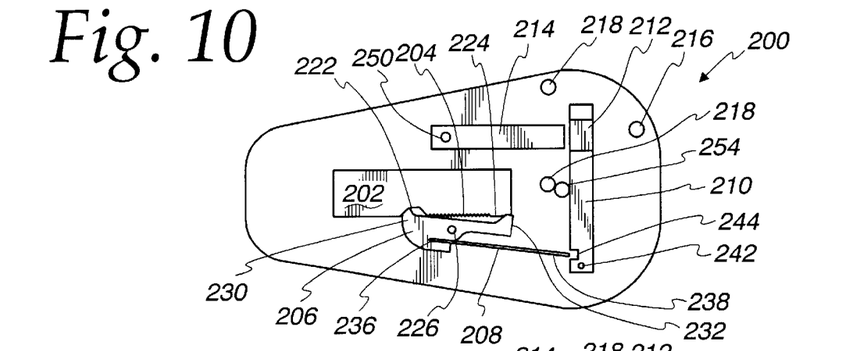
FIG. 10 is an alternate embodiment of an acceleration sensitive valve shut off mechanism in a tripped position.

The valve handle 202 and detents 204 operate as described above in the first described embodiment of a shut off mechanism. Similarly, the sear 206 and leaf spring 208 operate as described above.

The unique feature of this acceleration sensitive shut off mechanism 200, is the acceleration sensor portion, which includes the release magnet 212 and the pivoted trip 214 which is made of magnetically attractive material such as steel. This type of acceleration sensor senses accelerations (or decelerations) that are strong enough to overcome the attractive magnetic force between the release magnet 212 and the trip 214.

The valve handle 202 includes additional operating components such as a handle recess 222 and a handle flat 224. The sear 206 includes a pivot 226, a tongue 230, and a lever arm 232. The leaf spring 208 is cantilevered to the sear 206 at a proximate end 236 and includes a distal end 238. The release 210 includes the release magnet 212, a pivot 242, and a recess 244. The trip 214 includes a pivot 250. Finally, a release stop 254 limits the counterclockwise travel of the release 210.

Beginning with FIG. 10, this shut off mechanism 200 is illustrated in a "tripped" position with the valve handle 202 in a closed position (extreme right), the sear tongue 230 is disposed in the handle recess 222, the sear lever arm 232 is resting on the handle flat 224, the leaf spring 208 is untensioned, the release 210 is pivoted to the extreme counterclockwise position against the release stop 254, and the trip 214 is attracted to the release support magnet 212. No water is flowing in this position.

Figure 11:
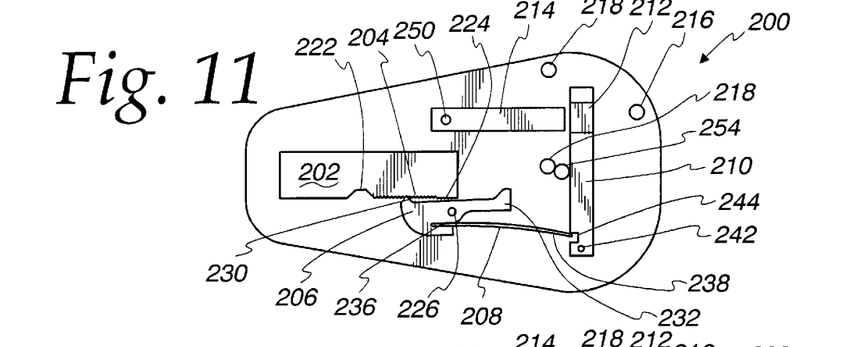
FIG. 11 is the shut off mechanism of FIG. 10 in a set position.
Figure 12:
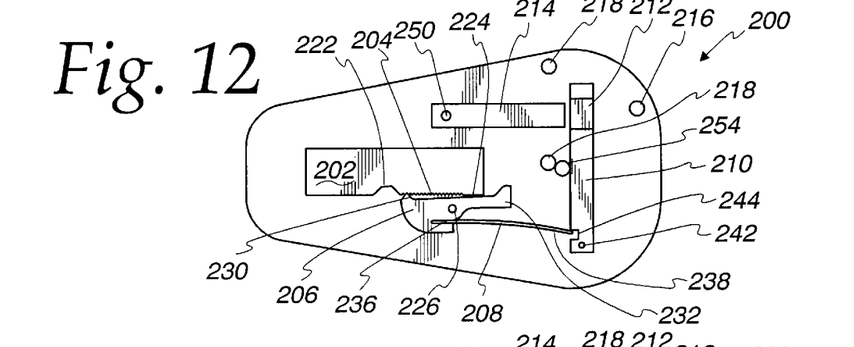
FIG. 12 is the shut off mechanism of FIG. 10 in the set position and a leaf spring in a greater degree of tension.

FIG. 11 illustrate the mechanism 200 in a "set" position and as the handle is moving back. The valve handle 202 is in an open position (partially to the left), the sear tongue 230 is engaged to a valve handle detent 204, the leaf spring 208 is loaded due to its distal end 238 being disposed in the release recess 244 and the sear being pivoted counterclockwise, the release 210 is pivoted to the extreme counterclockwise position against the release stop 254, and the trip 214 is attracted to the release magnet 212. In this position, fluid is flowing through the monitor. FIG. 12 illustrates the mechanism 200 in an intermediate position while the valve is being moved. The tongue 230 is not engaged in a detent 204. FIG. 11 shows the tongue 230 in the "bottom" of the detent 204—(valve is in a "set" position). FIG. 12 shows the tongue 230 at the "top" of a detent 204—(due to moving the valve).

Figure 13:
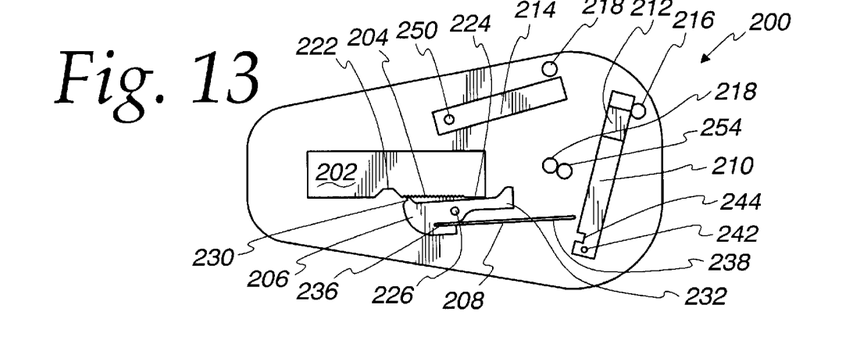
FIG. 13 is the shut off mechanism of FIG. 10 at the instant it is being tripped.

FIG. 13 illustrates the mechanism 200 at the instant of tripping. In this position, the valve handle 202 is in an opened position (to the left) with the sear tongue 230 engaging a valve handle detent 204, but there is no longer a force holding the tongue 230 in the detent 204 because the leaf spring distal end 238 has been released by the release recess 244. The release 210 has pivoted to the extreme clockwise position against the first peg 216, and the trip 214 has pivoted counterclockwise into engagement with one of the trip pegs 218. The trip 214 and the release magnet 212 are pulled apart by an acceleration of the monitor housing (not illustrated) which overcomes the magnetic attraction between the trip 214 and the release magnet 212. The trip peg 218 limits the pivot distance of the trip 214. In the FIG. 13 position, fluid is still flowing through the monitor, but will soon be stopped because the valve handle 202 will be returning to the position illustrated in FIG. 10.

A third embodiment of an acceleration sensitive valve shut off mechanism 300 is illustrated in FIGS. 14, 15, 16, and 17. This mechanism 300 includes a handle 40, a spring 304 to bias the handle 40 toward a closed position, a release bar 308, and a pendulum, 310.

Figure 14:
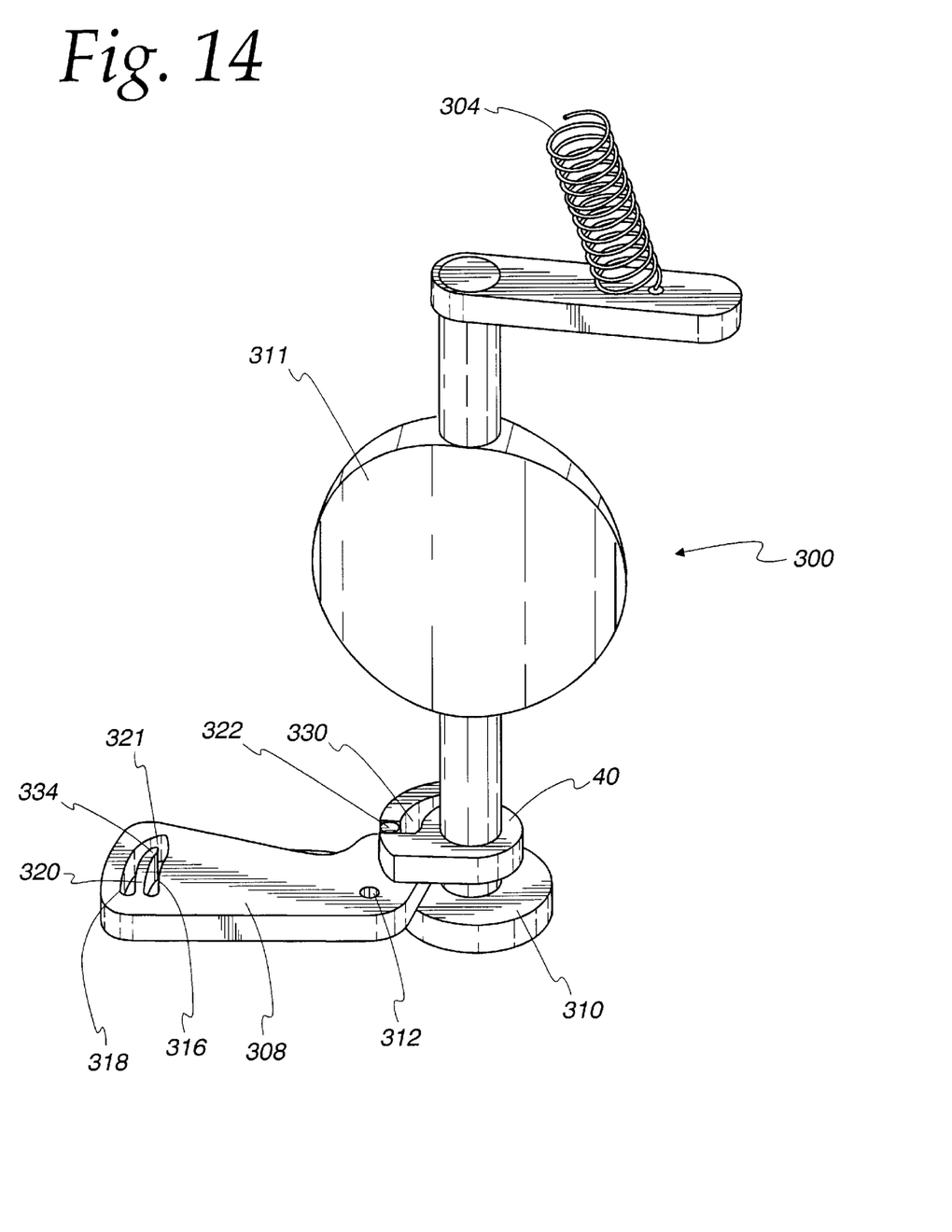
FIG. 14 is a perspective view of a third embodiment of an acceleration sensitive shut off mechanism in a set position in accordance with the present invention.

As in the above embodiments, the handle 40 moves the valve 48 between an open position and a closed position, and cocks the mechanism 300. In this illustration the valve 48 is not a slide valve, but is depicted as a butterfly valve having butterfly 311.

The release bar 308 is connected to the monitor housing 32 at pivot 312. The release bar 308 includes an inner radius groove 316 and an outer radius groove 318 separated by a wall 320 and connected at the end of the wall 320 by an open portion 321. Offset from the pivot 312 is an upwardly extending lock pin 322.

The pendulum 310 is joined to the monitor housing 32 at a pendulum pivot 328. The pendulum 310 includes an upwardly extending trip pin 334 that extends into the grooves 316, 318, and the open portion 321 of the release bar 308. The trip pin 334 is offset from the pendulum pivot 328 such that movement of the pendulum 310 will cause the trip pin 334 to move within the radiused grooves 316, 318 and open portion 321 of release bar 308 in the manner described below.

Figure 15:
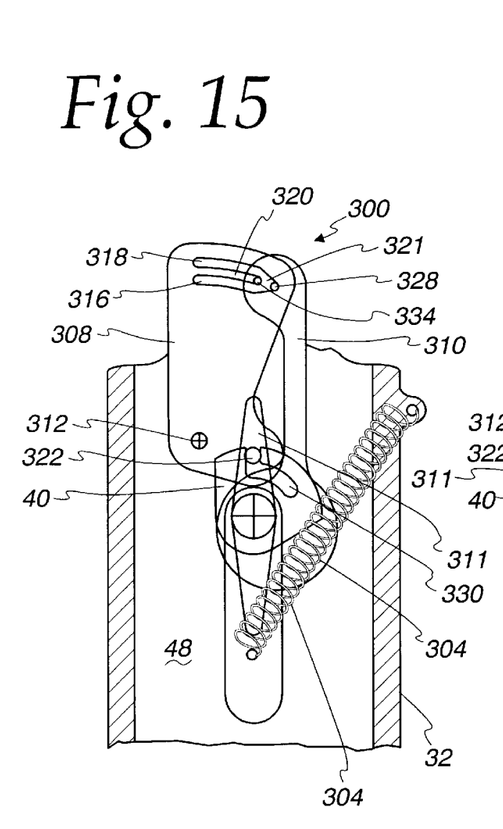
FIG. 15 is the shut off mechanism of FIG. 14 in a "set" position.

As illustrated in FIG. 15, the mechanism 300 is in a "set" position wherein the handle 40 is in an open position, fluid is flowing, the release bar 308 is in a precariously stable position with the trip pin 334 bearing on the end of the wall 320, and the lock pin 322 is in the stepped portion of the cam groove 330. This position is described as "precariously stable" because the trip pin 334 is bearing of the end of the wall 320 to prevent the release bar 308 from pivoting in a clockwise direction due to the bias of the spring 304. In this position, the pendulum 310 is at rest and no acceleration in being experienced.

Figure 16:
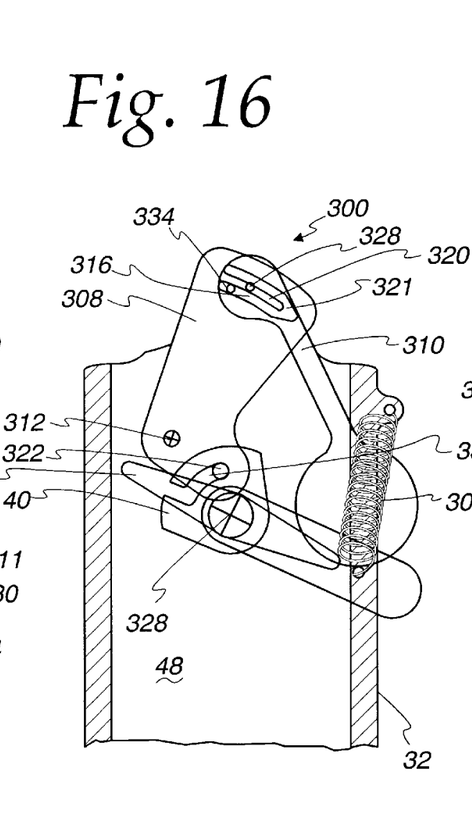
FIG. 16 is the shut off mechanism of FIG. 14 in a "right tripped" position.

In FIG. 16, the pendulum 310 has swung to the right due to an acceleration or deceleration of the housing 32 relative to the pendulum 310. The movement to the right causes the trip pin 334 to slide off the end of the wall 320, which causes the release bar 308 to pivot clockwise at the urging of spring 304. As a result, the trip pin 334 slides into the inner radiused groove 316 and the lock pin 322 moves into the cam groove 330 of the handle 40 allowing the handle 40 and the butterfly 311 to move toward the closed position. The engagement of lock pin 322 in the cam groove 330 prevents the mechanism 300 from returning to the set position (FIG. 14) without an operator moving the handle 40 to an open position.

Figure 17:
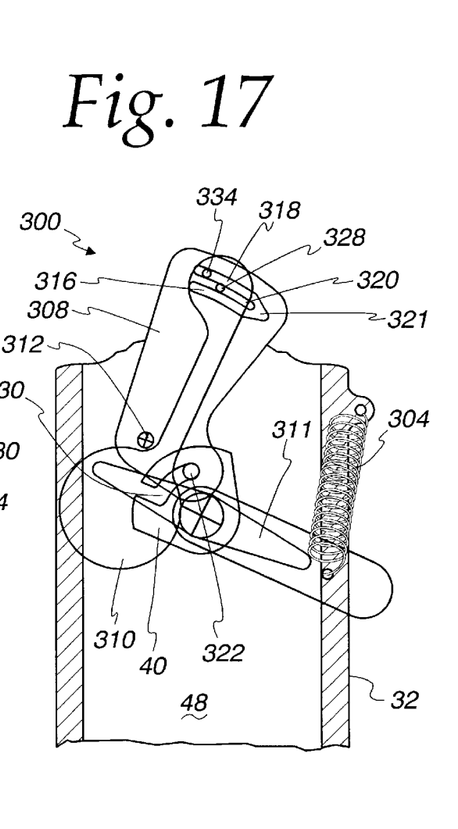
FIG. 17 is the shut off mechanism of FIG. 14 in a "left tripped" position.

FIG. 17 illustrates a similar tripped position except that in this case the pendulim 310 has swung to the left causing the trip pin 334 to slide into the outer radiused groove 318. Again, the mechanism 300 will not reset automatically, rather only operation of the handle 40 can reopen the valve 48 and reset the mechanism 300.

Clockwise movement of the handle 40 to a position slightly past the set position of FIG. 15 rotates release bar 308 and pendulum 310 to a position where trip pin 334 is aligned opposite the wall 320 by virtue of the "V" shape of open space 321. Releasing the handle 40 allows the mechanism 300 to return to the set position of FIG. 15.

One skilled in the art will recognize that other types of acceleration sensors can be used in the present invention including but not limited to electronic or piezometric sensors, pendulum sensors, or proximity sensors.

While the device of the preferred embodiment includes only mechanical elements to provide the motive force for closing the valve, it is to be understood that electrical, chemical, hydraulic, pneumatic, or other methods could be employed with equal effectiveness.

The foregoing detailed description of the drawings is intended for clearness of understanding only. No unnecessary limitations therefrom should be read into the following claims.

What is claimed is:

1. A valve having an open position and a closed position, the valve being biased toward the closed position and comprising:

a housing defining a recess;

a handle operatively mounted to the housing for moving the valve to the open position;

a sear for engaging the handle when the valve is in the open position;

a sear spring for urging the sear into engagement with the handle when the valve is in the open position;

a release for disengaging the sear from the handle; and a bearing member disposed in the recess of the housing and in bearing support of the release when the valve is in the open position, whereby movement of the valve at an acceleration above a pre-determined level dislodges the bearing member from the recess, removes support of the release, disengages the sear from the handle, and moves the valve toward the closed position.

2. The valve of claim 1, wherein the housing recess is a groove and the bearing member is a rod.

3. The valve of claim 1, wherein the recess is a groove and the bearing member is a pair of rods disposed end-to-end in the groove when the valve is in the open position.

4. The valve of claim 1, wherein the valve has a plurality of open positions and the handle is adapted to move the valve between the closed position and any of the open positions.

5. The valve of claim 1, wherein the sear spring is a leaf spring.

6. The valve of claim 1, wherein the sear spring is a leaf spring, having a first end fixed to the sear, and a second end for engagement by the release.

7. The valve of claim 1, wherein the release is pivotably mounted to the housing.

8. The valve of claim 1, wherein gravity returns the bearing member to the recess when the valve is in the closed position.

9. The valve of claim 1, and further comprising:
a dampener to slow the closing of the valve after the sear releases the handle.

10. The valve of claim 1, and further comprising:
a dampener to slow the closing of the valve after the sear releases the handle, the dampener comprising:
a chamber fixed to the housing;
a paddle connected to the valve for movement with the valve between the open position and the closed position, the pivot disposed in the chamber; and
a fluid disposed in the recess and substantially surrounding the paddle, the fluid having a viscosity greater than the viscosity of air.

11. The valve of claim 1, wherein the release comprises:
a pivot mounted to the housing;
a first end on one side of the pivot and a second end on the opposite side of the pivot;
the first end for engaging the sear spring; and
the second end including a bearing surface for bearing on the bearing member when the valve is in the open position.

12. A monitor comprising:
a housing defining a water passage;
a valve disposed in the water passage moveable between an open position and a closed position, and biased toward the closed position;
a valve handle for moving the valve between the open position and a closed position;
a sear for engaging the valve handle in the open position;
a sear spring for urging the sear into engagement with the handle in the open position;
a release mounted on the housing and having a release portion and moving the sear out of engagment with the handle; and
an acceleration sensor disposed in the housing which reacts to movement of the housing at an acceleration above a pre-determined level by disengaging the sear from the handle and thereby move the valve towards the closed position.

13. The monitor of claim 12, wherein the acceleration sensor includes a recess in the housing and a movable bearing member for supporting the release.

14. The monitor of claim 12, wherein the acceleration sensor includes a pair of rods disposed end-to-end in the groove when the valve is in a open position.

15. The monitor of claim 12, wherein the valve has a plurality of open positions and the handle is adapted to move the valve between the closed position and any of the open positions.

16. The monitor of claim 12, wherein the sear spring is a leaf spring.

17. The monitor of claim 12, wherein the sear spring is a leaf spring, having a first end fixed to the sear, and a second end for engagement by the release.

18. The monitor of claim 12, wherein the release is pivotably mounted to the housing.

19. The monitor of claim 13, wherein gravity returns the bearing member to the recess when the valve is in the closed position.

20. The monitor of claim 12, wherein the housing is a component of a firefighting monitor.

21. The monitor of claim 12, and further comprising:
a dampener to slow the closing of the valve after the sear releases the handle.

22. The monitor of claim 12, and further comprising:
a dampener to slow the closing of the valve after the sear releases the handle, the dampener comprising:
a chamber fixed to the housing;
a paddle connected to the valve for movement with the valve between the open position and the closed position, the paddle disposed in the chamber; and
a fluid disposed in the chamber and substantially surrounding the paddle, the fluid having a viscosity greater than the viscosity of air.

23. The monitor of claim 12, wherein the release comprises:
a pivot mounted to the housing;
a first end on one side of the pivot and a second end on the opposite side of the pivot;
the first end including a recess for receiving a second end of the sear spring; and
the second end including a bearing surface for bearing on the bearing member when the valve is in the open position.

24. A portable monitor comprising:
a housing defining a water passage;
a valve disposed in the water passage moveable between an open position and a closed position;
a valve handle for moving the valve between the open position and the closed position; and
an acceleration sensitive device joined to the housing, which reacts to sliding movement of the housing at an acceleration above a pre-determined level by moving the valve towards the closed position.

25. The portable monitor of claim 24, wherein the valve is biased toward the closed position.

26. The portable monitor of claim 24, wherein the acceleration sensitive device comprises:
a sear for engaging the valve handle in the open position;
a sear spring for urging the sear into engagement with the handle in the open position;
a release mounted on the housing and having a release portion for moving the sear out of engagement with the handle; and an acceleration sensor disposed to engage the release to move the sear out of engagement with the handle and thereby move the valve towards the closed position.

27. The portable monitor of claim 24, wherein the acceleration sensitive device includes a recess in the housing and a movable bearing member for supporting the release.

28. The portable monitor of claim 24, wherein the acceleration sensitive device includes a pair of rods disposed end-to-end in a groove when the valve is in the open position.

29. The portable monitor of claim 24, wherein the valve has a plurality of open positions and the handle is adapted to move the valve between the closed position and any of the open positions.

30. The portable monitor of claim 26, wherein the sear spring is a leaf spring.

31. The portable monitor of claim 26, wherein the sear spring is a leaf spring, having a first end fixed to the sear, and a second end for engagement by the release.

32. The portable monitor of claim 26, wherein the release is pivotably mounted to the housing.

33. The portable monitor of claim 27, wherein gravity returns the bearing member to the recess when the valve is in the closed position.

34. The portable monitor of claim 24, wherein the monitor is a firefighting monitor.

35. The portable monitor of claim 26, and further comprising:
 a dampener to slow the closing of the valve after the sear releases the handle.

36. The portable monitor of claim 26, and further comprising:
 a dampener to slow the closing of the valve after the sear releases the handle, the dampener comprising:
 a chamber fixed to the housing;
 a paddle connected to the handle for movement of the valve between the open position and the closed position, the pivot disposed in the chamber; and
 a fluid disposed in the recess and substantially surrounding the paddle, the fluid having a viscosity greater than the viscosity of air.

37. The portable monitor of claim 26, wherein the release comprises:
 a pivot mounted to the housing;
 a first end on one side of the pivot and a second end on the opposite side of the pivot;
 the first end for receiving one end of the sear spring; and
 the second end for bearing on a bearing member when the valve is in the open position.

* * * * *

UNITED STATES PATENT AND TRADEMARK OFFICE
CERTIFICATE OF CORRECTION

PATENT NO.   : 6,354,320 B1
DATED        : March 12, 2002
INVENTOR(S)  : Kolacz et al.

It is certified that error appears in the above-identified patent and that said Letters Patent is hereby corrected as shown below:

<u>Title page,</u>
The following reference did not appear on the issued patent and should appear under OTHER PUBLICATIONS as disclosed in a June 27, 2001 Information Disclosure Statement filed with the USPTO:
-- PCT/ISA/210, International Search Report received December 5, 2000, 4pgs. --

Signed and Sealed this

Third Day of September, 2002

*Attest:*

*Attesting Officer*

JAMES E. ROGAN
*Director of the United States Patent and Trademark Office*